United States Patent
Moribe et al.

(10) Patent No.: US 11,296,927 B2
(45) Date of Patent: Apr. 5, 2022

(54) APPARATUS FOR INTEGRATING LOG, SYSTEM FOR INTEGRATING LOG, AND METHOD FOR INTEGRATING LOG

(71) Applicant: Hitachi, Ltd., Tokyo (JP)

(72) Inventors: Hirotaka Moribe, Tokyo (JP); Shinya Suenaga, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/153,142

(22) Filed: Jan. 20, 2021

(65) Prior Publication Data

US 2021/0297306 A1 Sep. 23, 2021

(30) Foreign Application Priority Data

Mar. 19, 2020 (JP) .............................. JP2020-049827

(51) Int. Cl.
*H04L 41/069* (2022.01)
*G06F 16/22* (2019.01)

(52) U.S. Cl.
CPC ............ *H04L 41/069* (2013.01); *G06F 16/22* (2019.01)

(58) Field of Classification Search
CPC .............................. H04L 41/069; G06F 16/22
See application file for complete search history.

(56) References Cited

U.S. PATENT DOCUMENTS

| | | | | |
|---|---|---|---|---|
| 11,151,584 B1* | 10/2021 | Sharma | ................... | G06Q 30/02 |
| 2006/0225073 A1* | 10/2006 | Akagawa | ................... | G06F 9/52 |
| | | | | 718/1 |
| 2013/0116976 A1* | 5/2013 | Kanemasa | .......... | G06F 11/3419 |
| | | | | 702/186 |
| 2013/0305358 A1* | 11/2013 | Gathala | ................. | H04W 24/08 |
| | | | | 726/22 |
| 2014/0012509 A1* | 1/2014 | Barber | .................... | G06F 3/015 |
| | | | | 702/19 |
| 2014/0301513 A1* | 10/2014 | Takahashi | ............. | H04J 3/0697 |
| | | | | 375/354 |
| 2018/0224884 A1* | 8/2018 | Oshima | ............... | G06F 11/3058 |
| 2018/0365975 A1* | 12/2018 | Xu | ........................... | G01V 3/12 |
| 2019/0149396 A1* | 5/2019 | Zafer | .................. | H04L 41/0609 |
| | | | | 709/224 |
| 2021/0249010 A1* | 8/2021 | Tayshete | ................. | G06F 3/167 |
| 2021/0297306 A1* | 9/2021 | Moribe | ................. | H04L 41/069 |
| 2021/0356915 A1* | 11/2021 | Wang | ...................... | G01S 19/47 |
| 2021/0398212 A1* | 12/2021 | Lutnick | .............. | G06F 16/9538 |

FOREIGN PATENT DOCUMENTS

JP 4347082 B2 10/2009

* cited by examiner

*Primary Examiner* — Tauqir Hussain
(74) *Attorney, Agent, or Firm* — Baker Botts L.L.P.

(57) ABSTRACT

Provided is an apparatus for integrating log that integrates logs in a series including a plurality of instruments each generating a log. The series includes: a log acquisition section that collects a plurality of logs from the plurality of instruments; a message ID time stamp processing section; a time stamp adjustment processing section; and a time stamp orders-of-sending-and-receiving confirmation processing section that confirms whether time reversal is present in the time stamps of the sending/receiving pair of the broadcast messages having the identical message ID in the plurality of time-base-adjusted logs. The time stamp adjustment processing section adjusts the time bases of the plurality of logs in such a manner as to resolve the time reversal in a case of presence of the time reversal in the time stamps of the sending/receiving pair of the broadcast messages.

18 Claims, 15 Drawing Sheets

F I G. 1
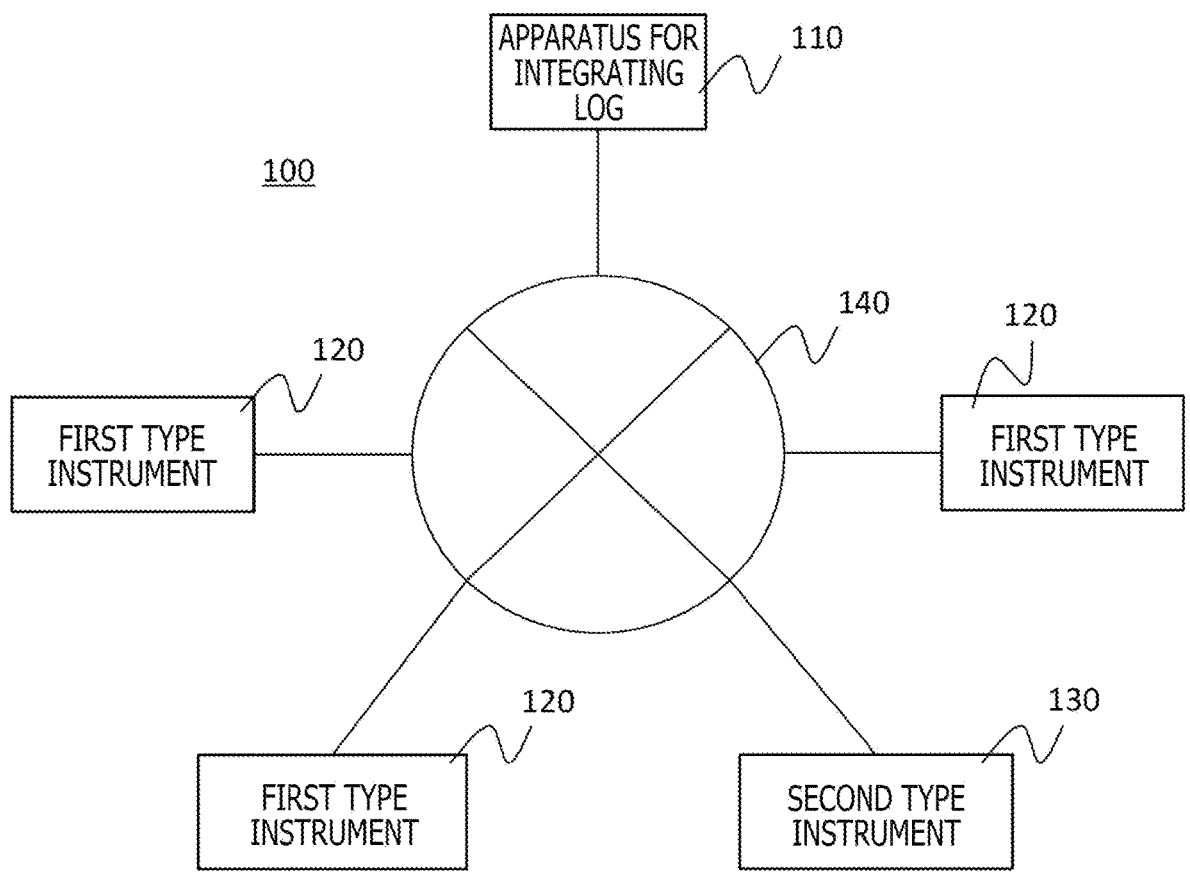

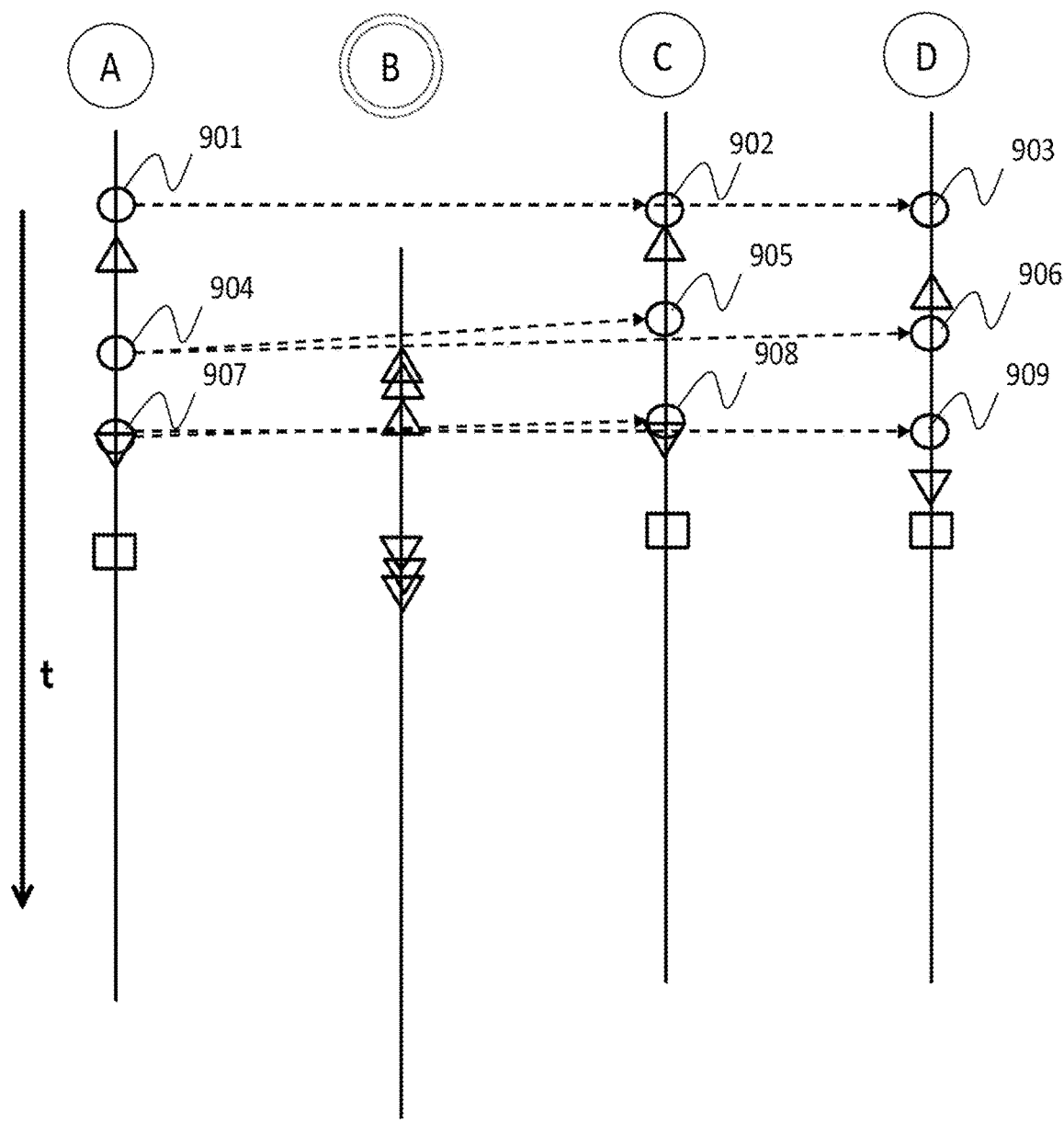

APPARATUS FOR INTEGRATING LOG, SYSTEM FOR INTEGRATING LOG, AND METHOD FOR INTEGRATING LOG

BACKGROUND OF THE INVENTION

1. Field of the Invention

The present invention relates to a technique for integrating logs acquired in a plurality of instruments.

2. Description of the Related Art

Instruments (a robot, an autonomous vehicle, a terminal, and the like) autonomously operating by artificial intelligence (AI) have emerged, and it is expected that the number of systems operating as a series increases in an environment in which these autonomous instruments affect one another.

In an environment in which a plurality of autonomously operating instruments affect one another, it is impossible to recognize a causal connection among behaviors (events) as those in the series by checking operating logs (hereinafter, simply referred to as "logs") of individual instruments. In other words, it is difficult to recognize in what causal connection the plurality of instruments operate and how the plurality of instruments cooperate with one another, only from the logs of the individual instruments.

A log obtained by integrating the logs in order of time (in time series) as the series (hereinafter, referred to as "integrated log") is necessary for grasping, analysis, verification, and the like of a behavior of the overall series so that the instruments can efficiently operate as the series.

Even in a case of integrating the logs of the instruments to generate the integrated log that sees the overall instruments from a higher perspective, the integrated log does not work properly by simple log collection in a heterogeneous environment of the series. The heterogeneous environment is assumed herein as a series in which instruments are not uniform but different types of instruments are allowed to be intermixedly present. In the heterogeneous environment, functions and programs that can be introduced into the instruments are restrained. While one instrument is customizable by programming, other devices could be non-customizable. It is, therefore, necessary to construct a framework that enables log collection even if different types of instruments are intermixedly present.

Furthermore, when each instrument operates depending on an independent clock, time bases of logs of the instruments do not always coincide with each other. Even if a network time protocol (NTP) that is a protocol used for time synchronization of computers and various kinds of instruments connected to a network is applied, the logs of the instruments have a time lag of approximately 10 msec.

JP-2005-235054-A discloses correcting a relative time lag of event trace data generated across a plurality of computing machines by calculating, as a time offset, a difference between internal clocks of the computing machines on the basis of event data associated with communication transmitted and received among the plurality of computing machines, and by adding the offset value to the collected event trace data.

The technology of JP-2005-235054-A, however, does not ensure accuracy of an order relation between each pair irrelevant in sending and receiving in the integrated log since the relative time log is corrected on the basis of the time offset of each sending and receiving pair.

An object of the present invention is, therefore, to generate a log integrated in order of time as a series.

SUMMARY OF THE INVENTION

One preferable aspect of the present invention is an apparatus for integrating log, for integrating logs in a series including a plurality of devices generating the logs. This apparatus includes: a log acquisition section; a message ID time stamp processing section; a time stamp adjustment processing section, and a time stamp orders-of-sending-and-receiving confirmation processing section. The log acquisition section collects a plurality of logs from the plurality of instruments. The message ID time stamp processing section causes times of time stamps to coincide with each other in one sending/receiving pair of broadcast messages having an identical message ID in the plurality of logs. The time stamp adjustment processing section adjusts time bases of the plurality of logs on the basis of the coincident time of the time stamps. The time stamp orders-of-sending-and-receiving confirmation processing section confirms whether time reversal is present in the time stamps of the sending/receiving pair of the broadcast messages having the identical message ID in the plurality of time-base-adjusted logs. The time stamp adjustment processing section adjusts the time bases of the plurality of logs in such a manner as to resolve the time reversal in a case of presence of the time reversal in the time stamps of the sending/receiving pair of the broadcast messages.

It is more preferable that the apparatus for integrating log according to the present invention further includes a pattern extraction processing section. The pattern extraction processing section extracts, from the plurality of logs, sending blocks that indicate sending patterns of unicast messages in logs of a plurality of sending side instruments and a receiving block that indicates receiving patterns corresponding to the sending patterns in the log of one receiving side instrument. Furthermore, the time stamp adjustment processing section adjusts time stamps in the log of the receiving side instrument in such a manner that times of time stamps of a sending/receiving pair of unicast messages smallest in temporal difference in a pair of the sending block and the receiving block.

Another preferable aspect of the present invention is a system for integrating log, having the apparatus for integrating log described above, a first type instrument and a second type instrument included in the series, the apparatus for integrating log integrating a first log generated by the first type instrument with a second log generated by the second type instrument. This system is a heterogeneous system in which the first type instrument includes a broadcast message generation section capable of sending and interpreting the broadcast messages, and in which the second type instrument does not include the broadcast message generation section.

Yet another preferable aspect of the present invention is a method for integrating log, for integrating first type logs generated by a plurality of first type instruments with a second type log generated by a second type instrument in a series including an apparatus for integrating log, the plurality of first type instruments, and the second type instrument, the first type instruments being each capable of sending and interpreting a broadcast message containing a message ID, and the second type instrument being incapable of sending and interpreting the broadcast message containing the message ID.

The method for integrating log executes: a first step, by one of the first type instruments, of sending the broadcast message containing the message ID, sending a unicast message, which is to be output to the log, to the second type instrument, and recording events of sending together with time stamps in the first type log of the one first type instrument; a second step, by each of the other first type instruments receiving the sent broadcast message, of sending a unicast message, which is to be output to the log, to the second type instrument, and recording events of sending and receiving together with time stamps in the first type log of each of the other first type instruments; a third step, by the second type instrument receiving the unicast messages sent from the first type instruments, of recording events of receiving together with time stamps in the second type log; and a fourth step, by the apparatus for integrating log, of collecting the first type logs and the second type log.

It is possible to generate a log integrated in order of time as a series.

BRIEF DESCRIPTION OF THE DRAWINGS

FIG. 1 is a block diagram depicting overall configurations of a system for integrating log;

FIG. 9B is a conceptual diagram illustrating part of the processing for integrating log;

DESCRIPTION OF THE PREFERRED EMBODIMENT

Figure 2:
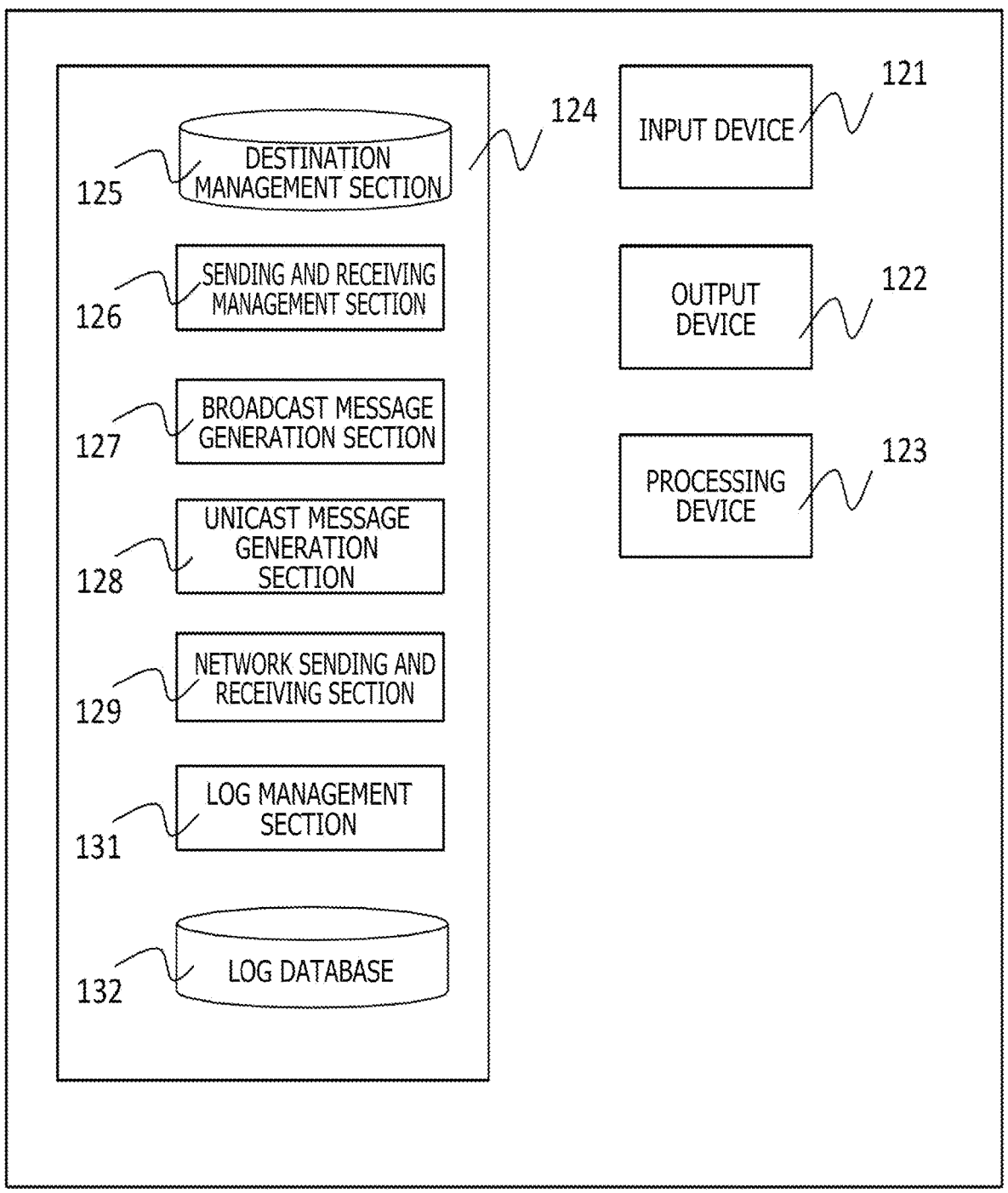
FIG. 2 is a block diagram depicting basic configurations of a first type instrument.

An embodiment will be described in detail with reference to the drawings. It is to be noted, however, that the interpretation of the present invention is not limited to that of a content described in the embodiment given below. A person skilled in the art could easily understand that specific configurations of the present invention can be changed without departure from an idea or intent of the present invention.

In the configurations of the invention to be described hereinafter, identical reference characters are used in common to denote identical parts or parts having similar functions among different drawings, and repetitive description thereof is often omitted.

When a plurality of constituent elements have an identical or similar function, the constituent elements are often described while the same reference character to which an additional character is added denotes each constituent element. It is noted, however, in a case of no need to distinguish these constituent elements, the constituent elements are often described without the additional characters.

In the present specification and the like, designations such as "first," "second," and "third" are added to identify the constituent elements and do not necessarily limit the number, an order, or contents thereof. Furthermore, a number for identifying each constituent element is employed on context by context basis, and the number used in one context does not always denote an identical configuration in other contexts. Moreover, the number is not intended to inhibit a constituent element identified by a certain number from sharing a function of a constituent element identified by the other number.

For facilitating understanding the invention, a position, a magnitude, a shape, a range, and the like of each configuration illustrated in the drawings and the like do not often represent an actual position, an actual magnitude, an actual shape, an actual range, and the like. For this reason, the present invention is not always limited to the positions, the magnitudes, the shapes, the ranges, and the like disclosed in the drawings and the like.

All the publications, patents, and patent applications cited in the present specification are incorporated into the present specification by referring thereto.

It is assumed that a constituent element expressed in the singular in the present specification includes the plural unless specified otherwise in context.

<1. Overall Configurations of System for Integrating Log>

FIG. 1 is a diagram depicting overall configurations of a system for integrating log 100 according to an embodiment. The system for integrating log 100 includes an apparatus for integrating log 110, first type instruments 120, a second type instrument 130, and a network 140.

The apparatus for integrating log 110 is an apparatus that collects logs from the first type instruments 120 and the second type instrument 130 and that generates an integrated log in time series. Configurations and functions of the apparatus for integrating log 110 will be described later in detail.

The first type instruments 120 and the second type instrument 130 are instruments included in a series, and are each assumed to generate a log containing time information. It is assumed herein that this series is a heterogeneous series, and that each first type instrument 120 is a configurable instrument, that is, functions of each first type instrument 120 are customizable by introducing software or the like. On the other hand, it is assumed that the second type instrument 130 is a non-configurable device, that is, initial functions of the second type instrument 130 are non-customizable. The estimated second type instrument 130 is an apparatus equipped with a well-known ordinary communication function. Types of the instruments may include a robot, any of various types of terminals, and the like, and functions and use applications of the instruments are not limited to specific functions and specific use applications.

It is assumed that the apparatus for integrating log 110, the first type instruments 120, and the second type instrument 130 are mutually connected by the network 140. The network 140 may be a wired network, a wireless network, or a combination of the wired network and the wireless network.

<2. Configurations and Operations of First Type Instrument>

FIG. 2 is a block diagram depicting basic configurations of each first type instrument 120. While each first type instrument 120 may be a robot, an autonomous vehicle, a terminal, or the like, the first type instrument 120 is assumed to include configurations of a basic information processing apparatus. Similarly to an ordinary information processing apparatus, each first type instrument 120 includes an input device 121, an output device 122, a processing device 123, and a storage device 124.

FIG. 2 represents information processing apparatus parts in the first type instrument 120. It is assumed that functions necessary for the robot, the autonomous vehicle, the terminal or the like, not depicted, are under control of the processing device 123 via the input device 121 and the output device 122. It is also assumed that the input device 121 and the output device 122 each include hardware for performing sending and receiving to and from the network 140.

In the present embodiment, functions of calculation, control, and the like are realized by performing specified processing in cooperation with other hardware by causing the processing device 123 to execute programs stored in the storage device 124. The programs executed by the information processing apparatus, functions of the programs, or means for realizing the functions is often referred to as "function," "means," "section," "unit," "module," or the like. This applies to the apparatus for integrating log 110 and the second type instrument 130.

In the present embodiment, the storage device 124 stores therein, as programs, a sending and receiving management section 126, a broadcast message generation section 127, a unicast message generation section 128, a network sending-receiving section 129, and a log management section 131. In addition, the storage device 124 stores therein, as data, a destination management section 125 and a log database 132.

The destination management section 125 is a database that manages data about a destination (address) of the second type instrument 130 belonging to the series. Furthermore, addresses of the first type instruments 120 are not necessarily grasped in advance because of broadcast sending; however, the addresses of the first type instruments 120 may be managed similarly to the address of the second type instrument 130. It is assumed that necessary address data is stored in advance.

The sending and receiving management section 126 is software that sends and receives predetermined messages to the other instruments connected to the network 140 via the network sending and receiving section 129 using the addresses stored in the destination management section 125.

The network sending and receiving section 129 is software that controls sending and receiving to and from the network 140 via the input device 121 and the output device 122.

The log management section 131 is software that generates events of the own first type instrument 120 as a time series log and that records the time series log in the log database 132.

The log database 132 is a database for recording and managing logs.

The configurations described so far are included in an ordinary instrument that holds communication in the series as well-known configurations, and the second type instrument 130 similarly includes these configurations.

On the other hand, the broadcast message generation section 127 and the unicast message generation section 128 are not present in the second type instrument 130 and are functions specially incorporated into each first type instrument 120. In other words, it may be considered that configurations of the second type instrument 130 are the configurations of FIG. 2 from which the broadcast message generation section 127 and the unicast message generation section 128 are excluded. Functions of the broadcast message generation section 127 and the unicast message generation section 128 will be described later in detail.

The configurations described so far may be configured by the single information processing apparatus as depicted in FIG. 2, or may be configured by the other apparatus to which optional parts of the input device 121, the output device 122, the processing device 123, and the storage device 124 are connected via the network.

In the present embodiment, equivalent functions to the functions configured by the software can be also realized by hardware such as a field programmable gate array (FPGA), an application specific integrated circuit (ASIC), or the like. The scope of the present invention also encompasses such an aspect.

Figure 3:
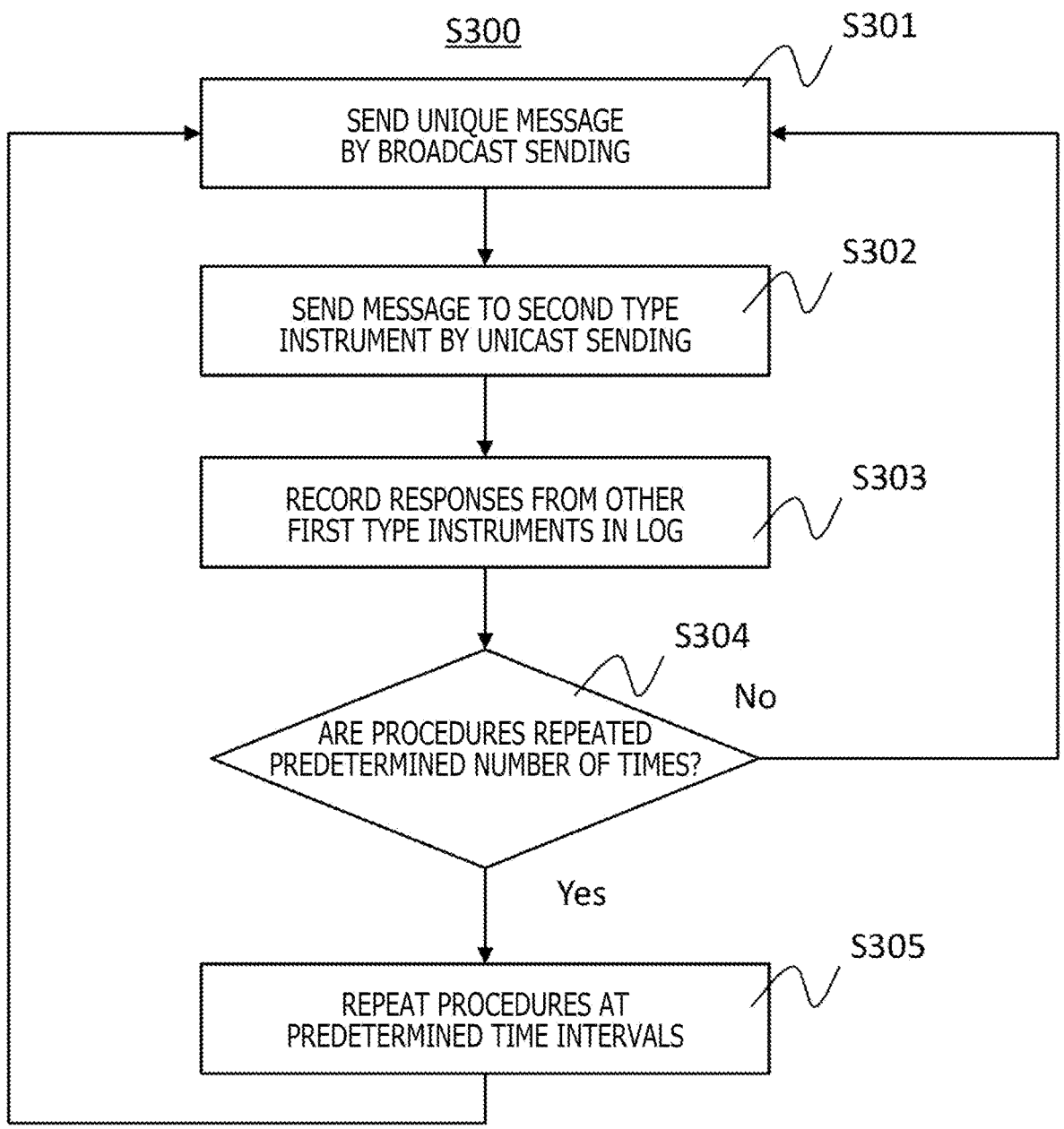
FIG. 3 is a flowchart depicting sending processing by the first type instrument.

FIG. 3 is a chart depicting a flow of broadcast sending processing S300 for creating an integrated log among the operations of each first type instrument 120. It is assumed that the software for performing such processing is installed in the first type instrument 120 as previously described. It is assumed that each processing together with a time stamp (hereinafter, often abbreviated as "TS") of each instrument is recorded by the log management section 131 as a log and recorded in the individual log database 132 of the instrument. It is to be noted herein that it is not guaranteed that time stamps of the instruments mutually coincide.

In Procedure S301, the broadcast message generation section 127 in each first type instrument 120 generates a message with a unique message ID. The sending and receiving management section 126 and the network sending and receiving section 129 send the generated message with the message ID by broadcast sending. The first type instruments 120 each similarly having the broadcast message generation section 127 is capable of receiving and interpreting the messages.

In Procedure S302, the unicast message generation section 128 in each first type instrument 120 generates an individual message addressed to the second type instrument 130. The sending and receiving management section 126 and the network sending and receiving section 129 send the generated individual message to the second type instrument 130. It is assumed herein that the sent individual message is a message that is known in advance to be output to the log in the second type instrument 130.

It is noted that the second type instrument 130 is assumed to recognize destinations (addresses) of the other instruments in the series by data managed by the destination management sections 125 provided in the instruments. The addresses of the other first type instruments 120 can be eventually grasped by a unicast response to the broadcast sending.

In Procedure S303, each first type instrument 120 receives responses to the message sent in Procedure S301 from the other first type instruments 120 via the network sending and receiving section 129 and the sending and receiving management section 126. In a case of receiving the responses, the log management section 131 generates a log and records the log in the log database 132 in the own first instrument 120.

In Procedure S304, a series of the processing S301 to S303 are repeated in such a manner as to be re-executed at predetermined intervals by an optional number of times (for example, two to three times). This is intended to prevent a failure to receive the messages since the message is not resent in broadcast sending even for occurrence of a collision.

In Procedure S305, the series of Processing S301 to S304 are repeated at predetermined intervals. The predetermined intervals are preferably not constant but random intervals. In a case, for example, in which all the instruments in the system are re-started up at the same timing, there is a concern of synchronizing operating timing of a plurality of instruments. In a case of presence of a plurality of instruments performing broadcast sending at the same timing, setting the intervals to constant intervals makes routine the presence of the plurality of instruments performing broadcast sending, resulting in frequent occurrence of message collisions on the network. Setting the intervals to random intervals makes it possible to avoid this problem.

Figure 4:
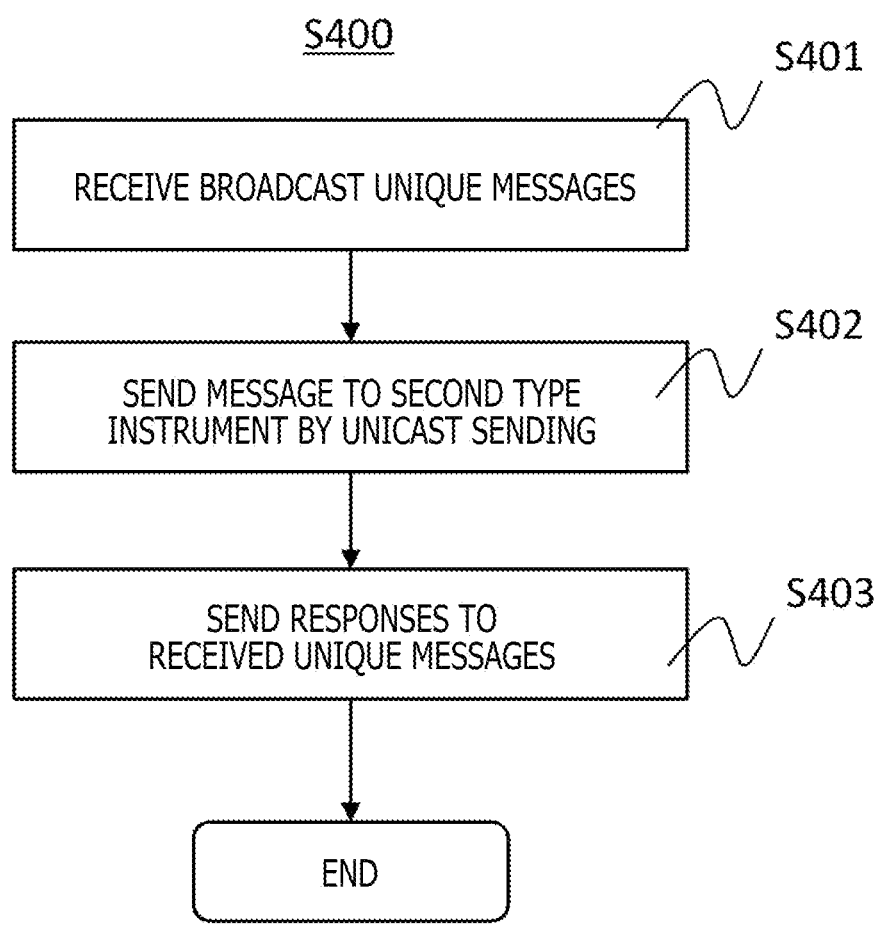
FIG. 4 is a flowchart depicting receiving processing by the first type instrument.

FIG. 4 is a chart depicting a flow of broadcast message receiving processing S400 among the operations of each first type instrument 120. It is assumed that the software for performing such processing is installed in the first type instrument 120. It is assumed that each processing together with a time stamp of each instrument is recorded by the log management section 131 as a log and recorded in the individual log database 132 of the instrument.

In Procedure S401, each first type instrument 120 receives broadcast messages sent from the other first type instruments 120 via the network sending and receiving section 129 and the sending and receiving management section 126. These messages are sent by the other first type instruments 120 in Procedure S301 and can be interpreted from the information in the broadcast message generation section 127. It is noted that the broadcast message generation section 127 is not implemented in the second type instrument 130 and the second type instrument 130 is incapable of interpreting the broadcast messages and, therefore, ignores the broadcast messages.

In Procedure S402, the unicast message generation section 128 generates an individual message addressed to the second type instruments 130 on an opportunity of receiving the broadcast messages in Procedure S401. The message is a message known in advance to be output to the log in the second type instrument 130. Furthermore, the sending and receiving management section 126 and the network sending and receiving section 129 send a message to the second type instrument 130 by unicast sending either immediately or after predetermined time.

In Procedure S403, the unicast message generation section 128 generates response messages to the broadcast messages received in Procedure S401 while containing the message IDs in the received broadcast messages in the response messages. The sending and receiving management section 126 and the network sending and receiving section 129 then send the response messages to the first type instruments 120 that are sources of the broadcast messages by unicast sending. These responses are received by the other first type instruments 120 in Procedure S303.

<3. Configurations and Operations of Second Type Instrument>

It is estimated in the present embodiment that the second type instrument 130 is a non-customizable (non-configurable) instrument. Therefore, the second type instrument 130 may have basic sending and receiving functions and a basic log generation function as an ordinary network instrument. As described previously, the configurations of the second type instrument 130 may be considered to be the configurations of FIG. 2 from which the broadcast message generation section 127 and the unicast message generation section 128 are excluded.

<4. Configurations and Operations of Apparatus for Integrating Log>

Figure 5:
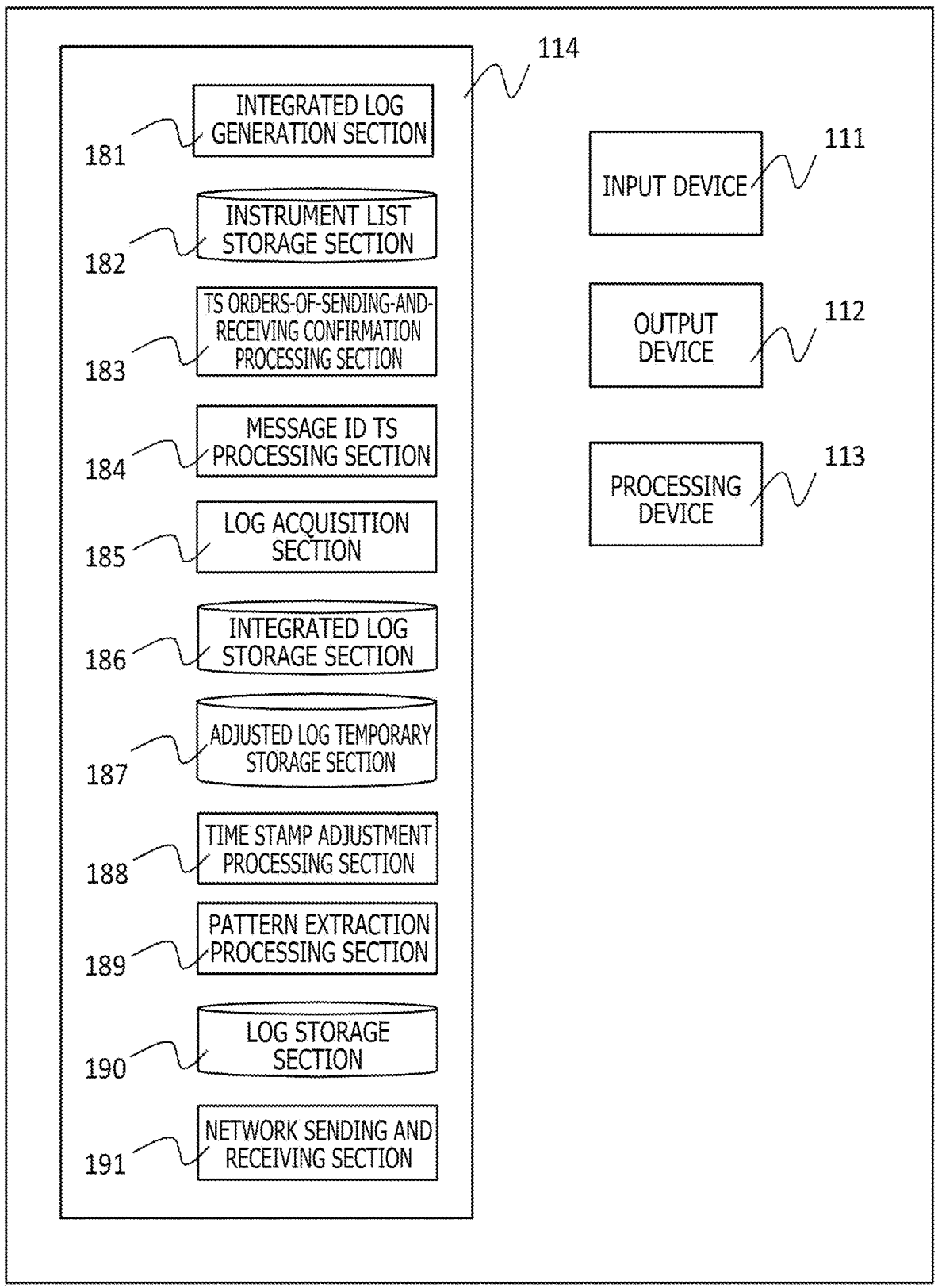
FIG. 5 is a block diagram depicting basic configurations of an apparatus for integrating log.

FIG. 5 is a block diagram depicting basic configurations of the apparatus for integrating log 110. It is assumed that the apparatus for integrating log 110 include configurations of the basic information processing apparatus. Similarly to the ordinary information processing apparatus, the apparatus for integrating log 110 includes an input device 111, an output device 112, a processing device 113, and a storage device 114. It is assumed that the input device 111 and the output device 112 each include hardware for sending and receiving to and from the network 140.

In the present embodiment, functions of calculation, control, and the like are realized by performing specified processing in cooperation with other hardware by causing the processing device 113 to execute programs stored in the storage device 114. The configurations may be configured by the single information processing apparatus as depicted in FIG. 5, or may be configured by the other apparatus to which optional sections are connected via the network. Equivalent functions to the functions configured by the software can be also realized by hardware. These functions are similar to those previously described in relation to the first type instrument 120.

The storage device 114 stores therein, as either software or databases, an integrated log generation section 181, an instrument list storage section 182, a time stamp orders-of-sending-and-receiving confirmation processing section 183, a message ID time stamp processing section 184, a log acquisition section 185, an integrated log storage section 186, an adjusted log temporary storage section 187, a time stamp adjustment processing section 188, a pattern extraction processing section 189, a log storage section 190, and a network sending and receiving section 191. Functions of the above sections will be described with reference to a processing flow by the apparatus for integrating log 110.

Figure 6:
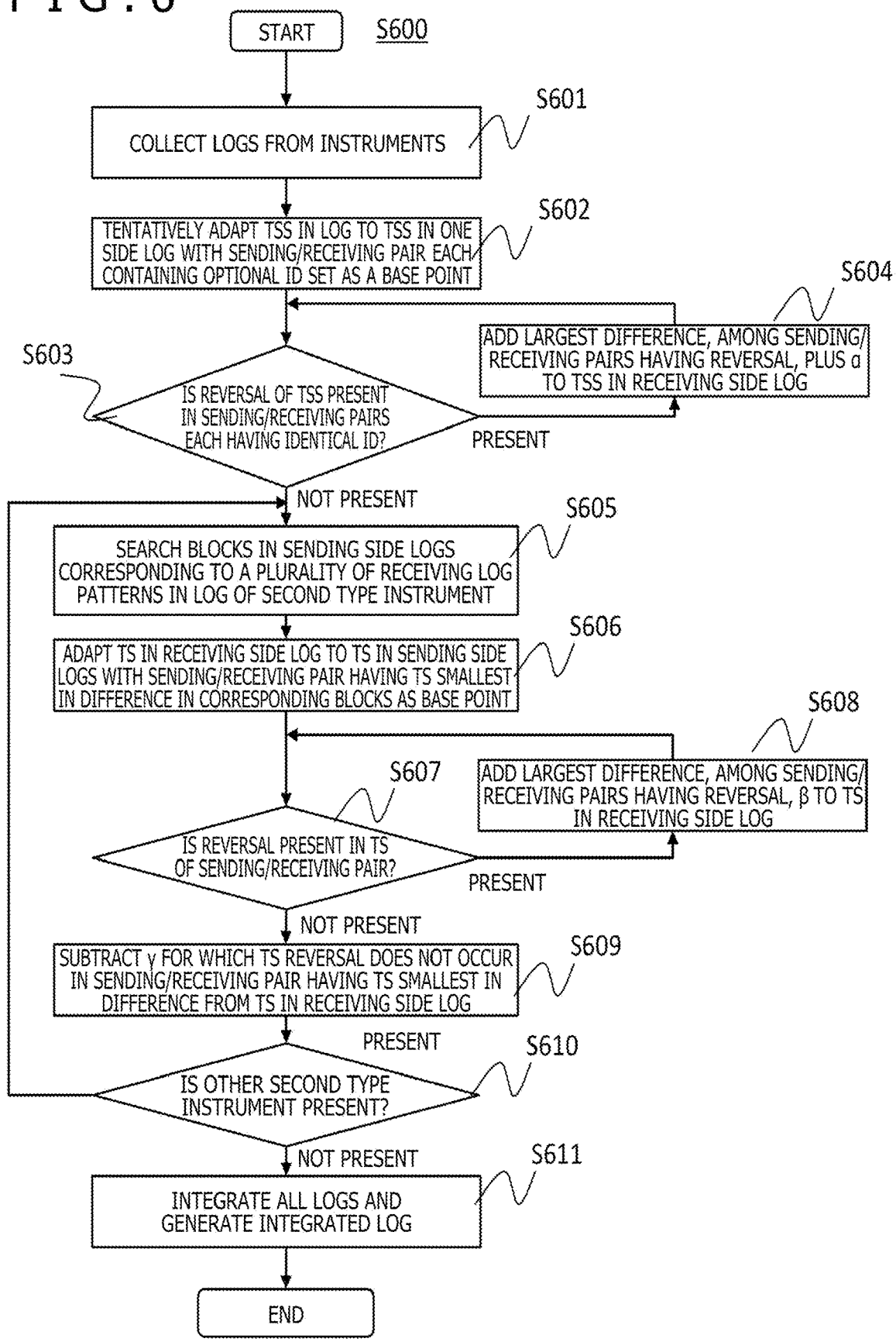
FIG. 6 is a flowchart depicting processing for integrating log by the apparatus for integrating log.

FIG. 6 is a flowchart depicting a flow of processing for integrating log S600 by the apparatus for integrating log 110. It is assumed that this processing is executed either at optional timing or on a regular basis by overall control over the integrated log generation section 181 in the apparatus for integrating log 110.

In Procedure S601, the log acquisition section 185 acquires a log per instrument from the first type instruments 120 and the second type instrument 130 either on a regular basis or at designated timing. It is assumed that the apparatus for integrating log 110 stores destinations and other specifications of the first type instruments 120 and the second type instrument 130 present in the series, in the instrument list storage section 182 in advance. The network sending and receiving section 191 is capable of calling the log from an optional instrument on the basis of information stored in the instrument list storage section 182. The collected log is stored in the log storage section 190 per instrument. The logs can be collected via the network 140 as described so far. Alternatively, the log can be recorded in a portable recording medium or the like provided in each instrument, the portable recording medium can be collected by physical transport means without using the network 140, and the log can be input from the input device 111.

Figure 7:
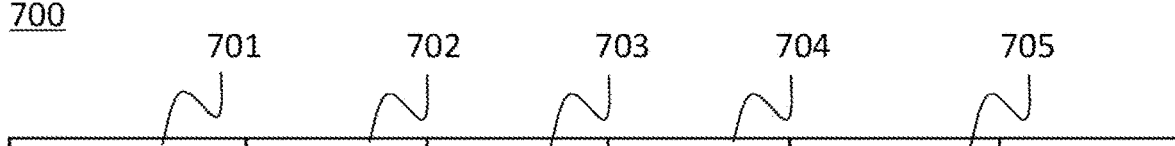
FIG. 7 is a table depicting an example of logs collected from the first type instruments.

FIG. 7 is an example of logs collected from the first type instruments 120. Time stamp (TS) 701 indicates a time of occurrence of an event. In FIG. 7, sending/receiving 702 is an event. In FIG. 7, "Send" indicates sending and "Recv" indicates receiving. IP address 703 indicates a destination address for the event "Send," and indicates a source address for the event "Recv."

This example depicts the log of the first type instrument having the IP address 703 "A." It is assumed that the other first type instruments 120 having the IP address "C" and "D" and the second type instrument 130 having the IP address "B" are present in the series.

At this time, for example, sending of a TS "12:23:13:000" indicates broadcast sending and corresponds to Procedure S301. Sending of a TS "12:23:130:010" indicates unicast sending to the second type instrument 103 having the IP address "B" and corresponds to Procedure S302. Receiving of a TS "12:23:13:040" and receiving of a TS "12:23:13:050" indicate unicast sending from the first type instruments 120 having the IP addresses "C" and "D," respectively, and correspond to Procedure S303.

Port 704 indicates an ID of a port from which a sending/receiving message is received. For example, the second type instrument 130 having the IP address 703 "B" is a non-configurable instrument and, therefore, a port number "8080" from which a message compliant with specifications of the instrument is received is allocated to the second type instrument 130. Message ID 705 is an ID uniquely identifying a message.

Figure 8:
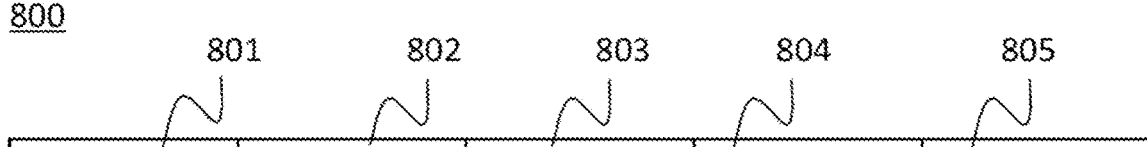
FIG. 8 is a table depicting an example of logs collected from the second type instrument.

FIG. 8 is an example of logs collected from the second type instrument 130 having the IP address 703 "B." Time stamp (TS) 801 indicates a time of occurrence of an event. In FIG. 8, sending/receiving 802 is an event. Meanings of IP address 803 and port 804 are similar to the IP address 703 and the port 704 in FIG. 7.

At this time, for example, three kinds of receiving, that is, receiving of a TS "12:25:13:015," receiving of a TS "12:25:13:030," and receiving of a TS "12:25:13:040" indicate receiving of the unicast messages sent from the first type instruments 120 having the IP addresses 803 "A," "C," and "D," respectively, in Procedure S302 or S402.

Figure 9A:
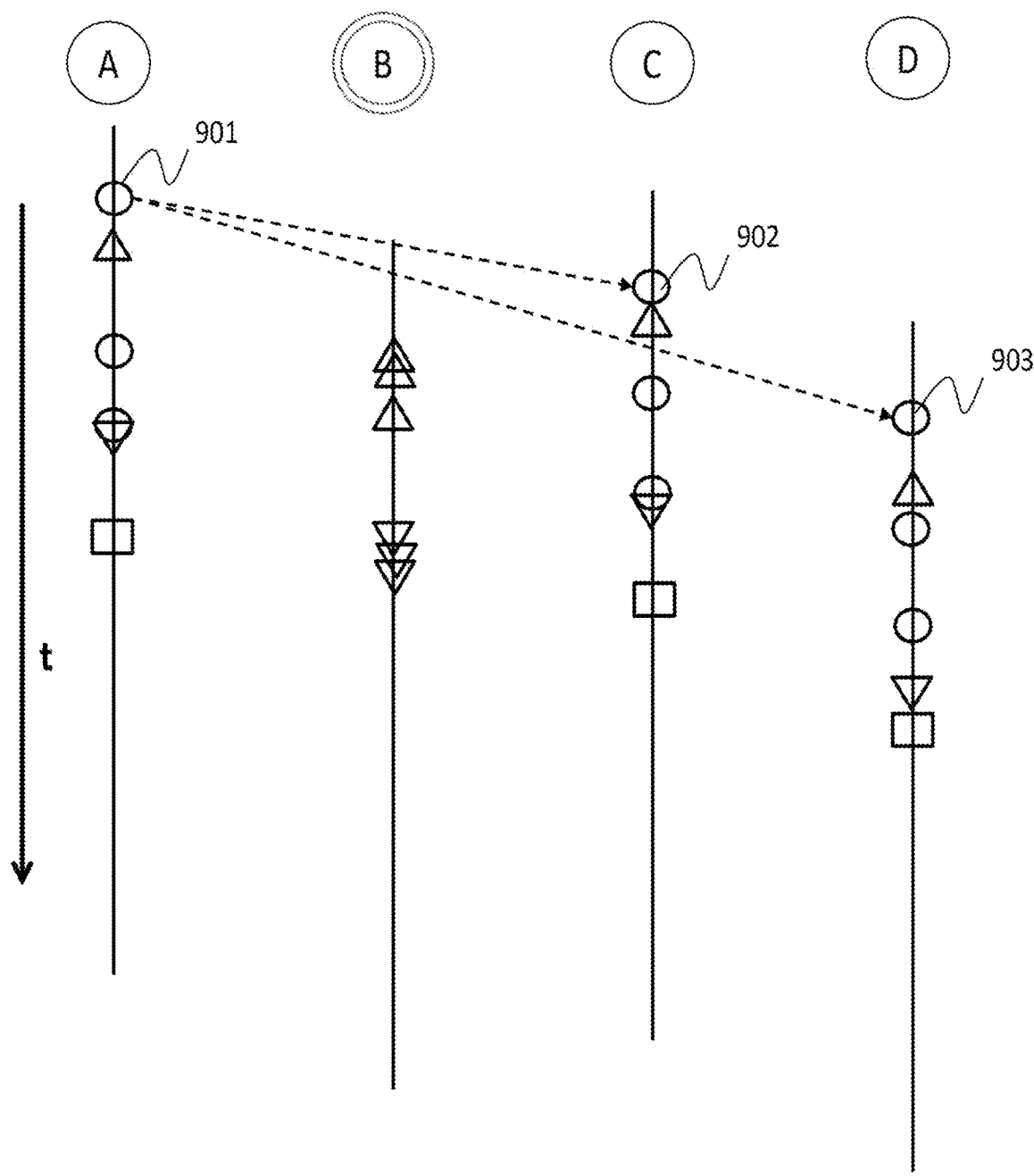
FIG. 9A is a conceptual diagram illustrating part of the processing for integrating log.

FIG. 9A is a schematic diagram illustrating a relation among the logs of the instruments collected in Procedure S601. It is assumed herein that the series includes the instruments A, B, C, and D, the instruments A, C, and D are the first type instruments 120, and the instrument B is the second type instrument 130. FIG. 9A schematically depicts the logs collected by the apparatus for integrating log 110 in Procedure S601. It is indicated that the log of the instrument A is A, the log of the instrument B is B, the log of the instrument C is C, and the log of the instrument D is D. A vertical direction is a time base and an event in the log generated by each instrument is indicated by a mark along the time base. It is not guaranteed that the time bases of the logs of the instruments coincide with each other.

By way of example, in FIG. 9A and the subsequent drawings, broadcast sending/receiving is indicated by a circle mark and unicast sending/receiving is indicated by a triangle mark. It is noted that only a part of all sending/receiving events are depicted and part of the unicast and the multicast are omitted for avoidance of complexity.

In Procedure S602 and subsequent procedures, the collected logs of the instruments are integrated. The integrated log generation section 181 exercises control over entirety of the processing for integrating log. In Procedure S602, the message ID time stamp processing section 184 adapts the time stamps in sending and receiving side logs each containing an optional message ID to the time stamps in the log of one side (for example, sending side) in the logs collected from the first type instruments 120. The time stamp adjustment processing section 188 then updates all the time stamps in the other side (for example, receiving side) log on the basis of a difference.

As depicted in FIG. 9A, in Procedure S602, the message ID time stamp processing section 184 first adapts the TSs in the sending side and receiving side logs each containing the optional message ID to the TS in the log of the one side in the logs collected from the first type instruments A, C, and D. In FIG. 9A, each event of the TS indicated by the circle mark indicates sending/receiving of a unique message broadcast in Procedure S301. A direction of sending/receiving is indicated by a dotted line arrow. It is supposed herein that a TS 901 of the instrument A is in the sending side log containing a predetermined message ID and that a TS 902 of the instrument C and a TS 903 of the instrument D are in the receiving side logs each containing an identical message ID. These stamps are supposed to coincide with each other if a message propagation delay and a processing delay are ignored. Therefore, the message ID time stamp processing section 184 adapts, for example, times of the TS 902 and the TS 903 to a time of the TS 901. Next, the time stamp adjustment processing section 188 changes the other time stamps in the logs C and D by as much as changes of the TS 902 and TS 903. In this way, the time bases of the logs A, C, and D are relatively shifted in such a manner that the times of the TS 901, the TS 902, and the TS 903 coincide with one another.

FIG. 9B is a diagram depicting a relation among the logs A, B, C, and D after Procedure S602. The time bases of the logs A, C, and D are shifted in such a manner that the times of the TS 901, the TS 902, and the TS 903 coincide with one another. The logs completed with correction of the time stamps and the like are stored in the adjusted log temporary storage section 187 as appropriate (the same applies hereinafter).

In Procedure S603, the time stamp orders-of-sending-and-receiving confirmation processing section 183 confirms whether temporal reversal occurs in the time stamps of sending and receiving in all sending/receiving pairs each having the identical message ID. The reversal between a sending time and a receiving time is actually impossible; thus, in a case of occurrence of the reversal, the time stamp adjustment processing section 188 adjusts the time bases of the receiving side in Procedure S604. In a case of non-occurrence, the processing goes to Procedure S605.

In the case of occurrence of the reversal of the time stamps of the sending and receiving in one sending/receiving pair having the identical message ID, the time stamp adjustment processing section 188 adds a difference between a sending time and a receiving time plus a to the receiving side logs in Procedure S604. The a is, for example, a constant specified as a margin in advance. When the reversal is present in a plurality of sending/receiving pairs, a largest difference plus a is added to the time stamps among the reversal pairs in which the reversal is present, and the processing returns to Procedure S603.

In the example of FIG. 9B, it is supposed that a receiving time of a TS 905 in the log C is earlier than a sending time of a TS 904 in the log A by 0.3 second, and that a receiving time of a TS 908 in the log C is earlier than a sending time of a TS 907 in the log A by 0.1 second. In this case, in Procedure S604, the time stamp adjustment processing section 188 shifts the time bases by adding the margin a to 0.3 second that is the largest difference 0.3 second to all TSs in the log C.

Procedure S604 is executed until no reversal is present in the time stamps of the sending/receiving pairs each having the identical message ID between the logs in Procedure S603. This processing is one-to-one adjustment between the instruments. Since occurrence of the receiving time earlier than the sending time is not normal, it is considered that a temporal contradiction between the logs can be resolved by selecting the appropriate a unless special circumstances in which the clocks of the instruments get out of order halfway. It is noted that the time stamp adjustment processing section 188 may perform processing for making the times of the time stamps of each sending/receiving pair closer to each other in a range in which the reversal of sending and receiving times does not occur to avoid an unnecessarily large lag between the times of the sending/receiving pair after Procedure S604.

Figure 9C:
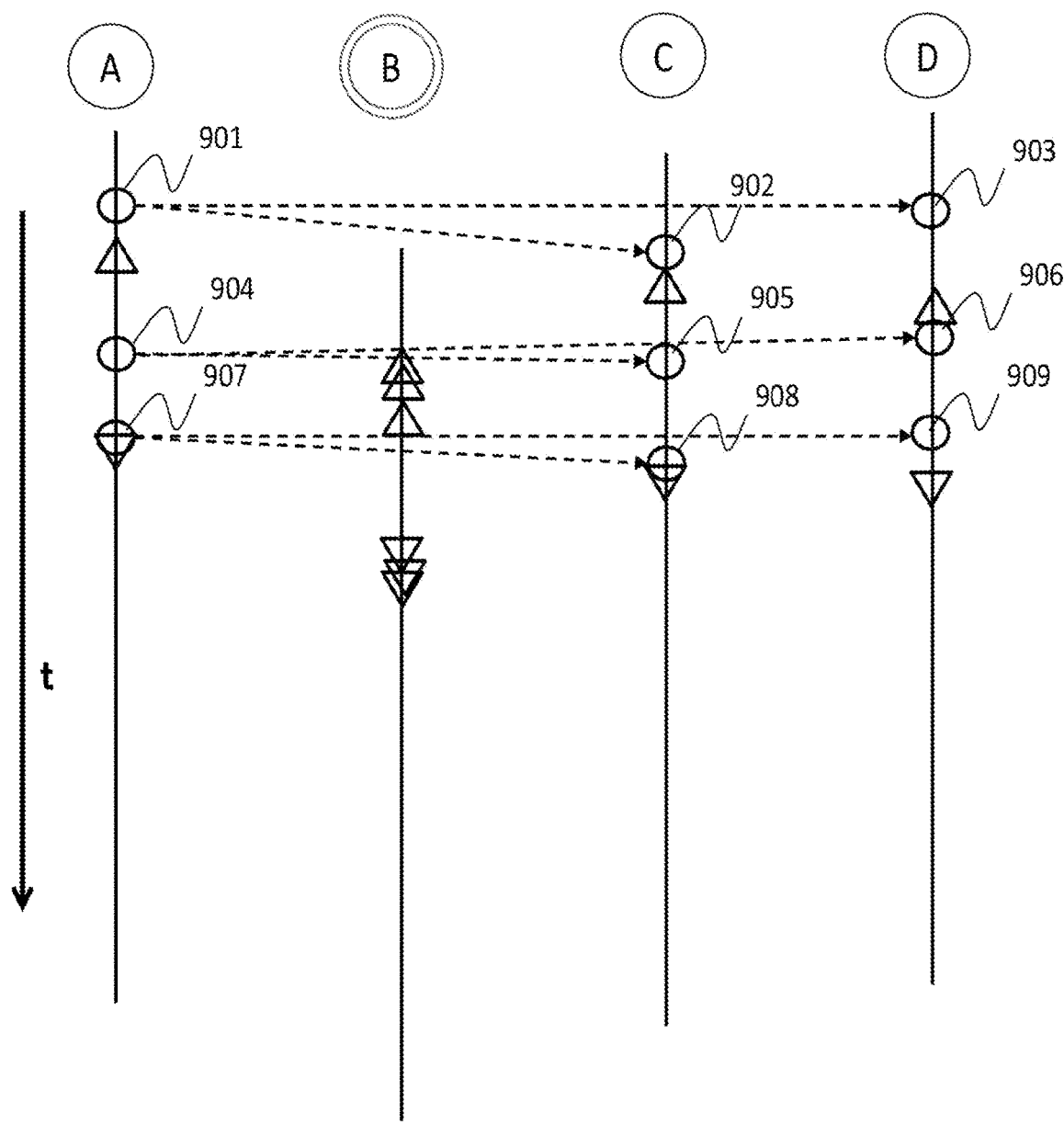
FIG. 9C is a conceptual diagram illustrating part of the processing for integrating log.

FIG. 9C is a diagram depicting a relation among the logs A, B, C, and D after the reversal of the TSs is resolved in all sending/receiving pairs each having the identical message ID in Procedure S603.

The adjustment of the time bases based on the logs A, C, and D of the first type instruments is now over. However, the log B of the second type instrument without a sending/receiving pair having the identical message ID is not adjusted yet. In the present embodiment, the time bases are adjusted by the logs of the configurable first type instruments on the basis of the sending/receiving timing of the broadcast messages as described so far. Subsequently, the time base of the second type log is adjusted on the basis of a relation in the sending/receiving timing of the unicast messages between the logs of the first type instruments and the log of the non-configurable second type instrument.

In Procedure S605, the pattern extraction processing section 189 searches at least one sending side log corresponding to and identical or similar in pattern to the log of the second type instrument in relation to receiving of a plurality of unicast messages. The pattern extraction processing section 189 is capable of performing the search using a combination of sending and receiving addresses of the messages as well as an order, an interval, and the like of the messages. Patterns in the receiving side log will be referred to as a "receiving block," and patterns in the sending side log will be referred to as a "sending block," hereinafter.

While all second type instruments are basically subjected to Procedure S605, all the first type instruments do not configure the sending block and a combination of an optional number of first instruments (n representative instruments) may be subjected to Procedure S605.

Figure 9D:
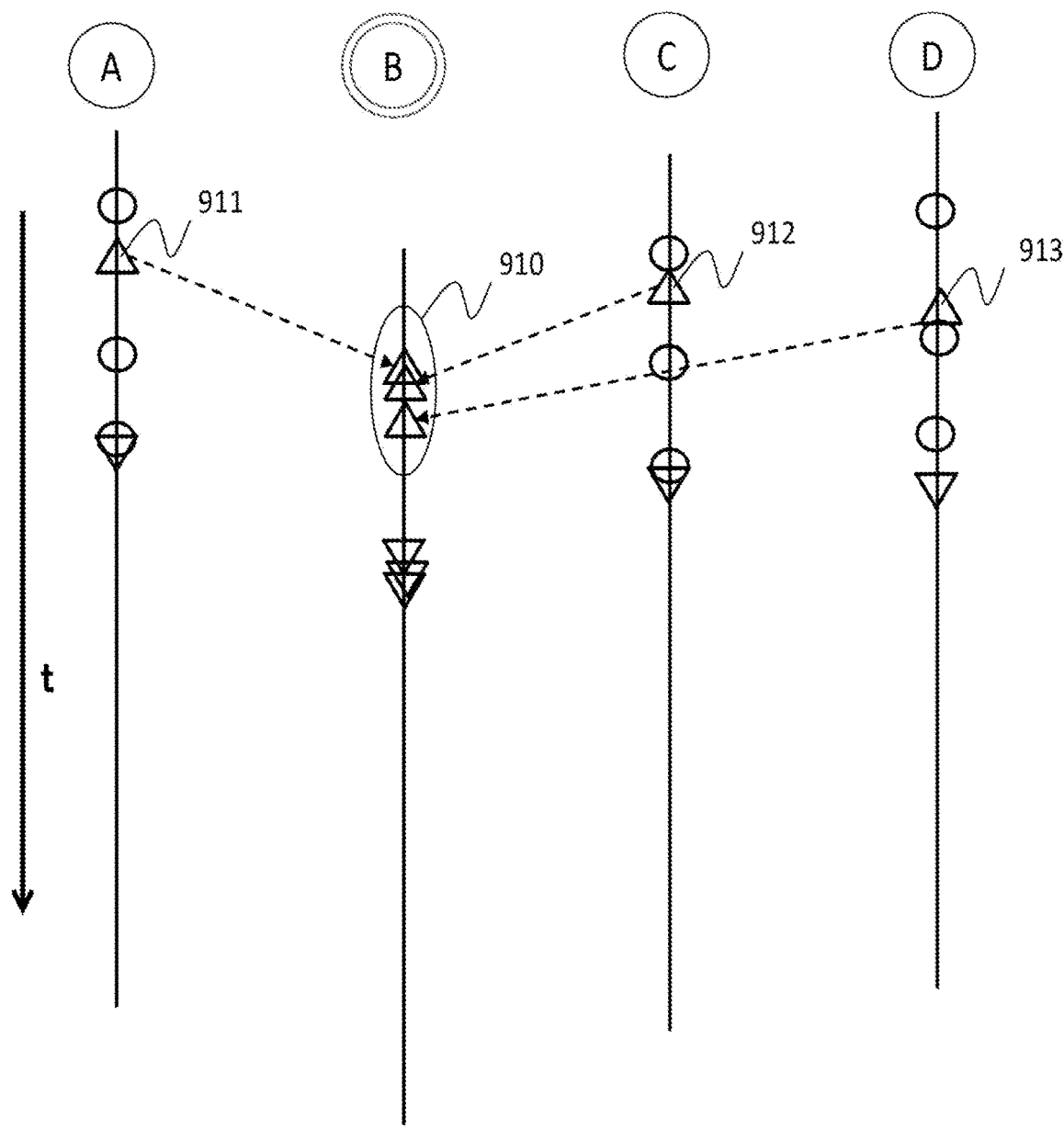
FIG. 9D is a conceptual diagram illustrating part of the processing for integrating log.

FIG. 9D depicts an example of a receiving block 910 in the log B under the same circumstances as those of FIG. 9C. In the receiving block 910, one instrument B receives the unicast messages from a plurality of instruments A, C, and D in this order. Therefore, the pattern extraction processing section 189 identifies sending blocks formed from the sending side logs indicated by a TS 911, a TS 912, and a TS 913 of the plurality of instruments using source addresses of the received unicast messages as well as an order, an interval, and the like of the unicast messages. In other words, the pattern extraction processing section 189 extracts sending blocks indicating unicast sending patterns from the plurality of instruments and a receiving block indicating the receiving patterns corresponding to the sending block in one instrument. The pattern extraction processing section 189 may basically identify sending side logs having the same order of sending as an order of receiving in a range of an estimated time log to extract the blocks.

It is noted that providing a plurality of type of messages sent to the second type instrument by unicast sending in response to the instruments or timing in Procedure S302 facilitates pattern extraction.

In Procedure S606, the time stamp adjustment processing section 188 adapts the time stamps in the receiving side log to the time stamps in the sending side logs in the sending/receiving pair having a smallest time stamp difference among the receiving log in the receiving block and the sending side logs in the corresponding sending blocks. Furthermore, the time stamp adjustment processing section 188 updates all the time stamps in the log of the second type instrument (receiving side) on the basis of this difference.

Figure 9E:
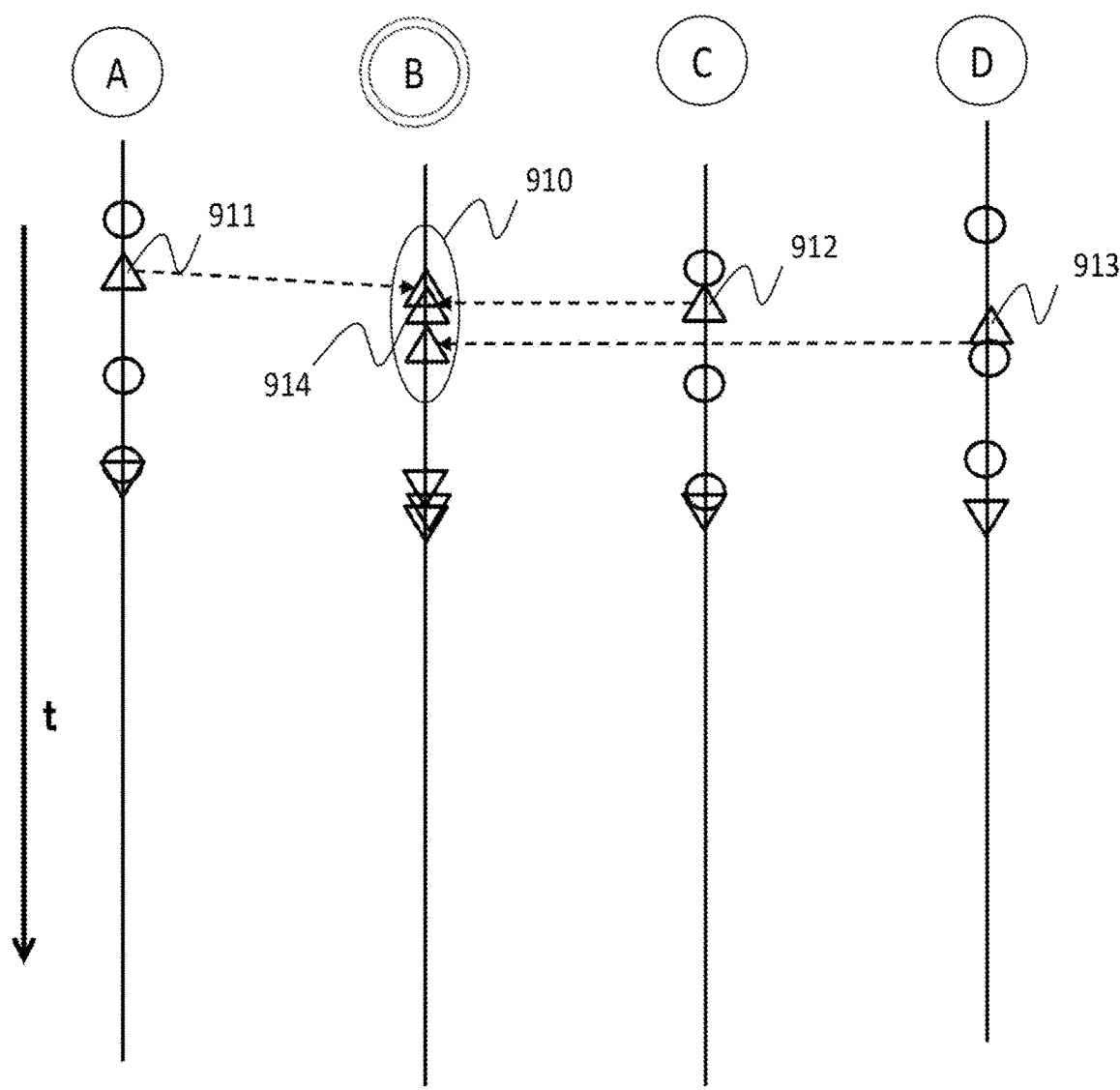
FIG. 9E is a conceptual diagram illustrating part of the processing for integrating log.

FIG. 9E depicts a state after the time stamp adjustment processing section 188 updates the time stamps in the log B and shifts the time base of the log B. Since a temporal difference is the smallest between a sending TS 912 in the log C and a receiving TS 914 in the log B in FIG. 9E, the time stamps in the log B are corrected in such a manner as to adapt a time of the TS 912 to a time of the TS 914.

In Procedure S607, the time stamp orders-of-sending-and-receiving confirmation processing section 183 confirms whether temporal reversal of the time stamps occurs between the log of the second type instrument in relation to the receiving messages and the logs of the corresponding sending messages. In a case of non-occurrence, the processing goes to Procedure S609.

In Procedure S608, in a case of occurrence of the reversal in the time stamps of the sending/receiving pair, the time stamp adjustment processing section 188 adds the largest difference, among the sending/receiving pairs having the reversal, plus B to the time stamps in the log of the second type instrument, and the processing returns to Procedure S607.

Figure 9F:
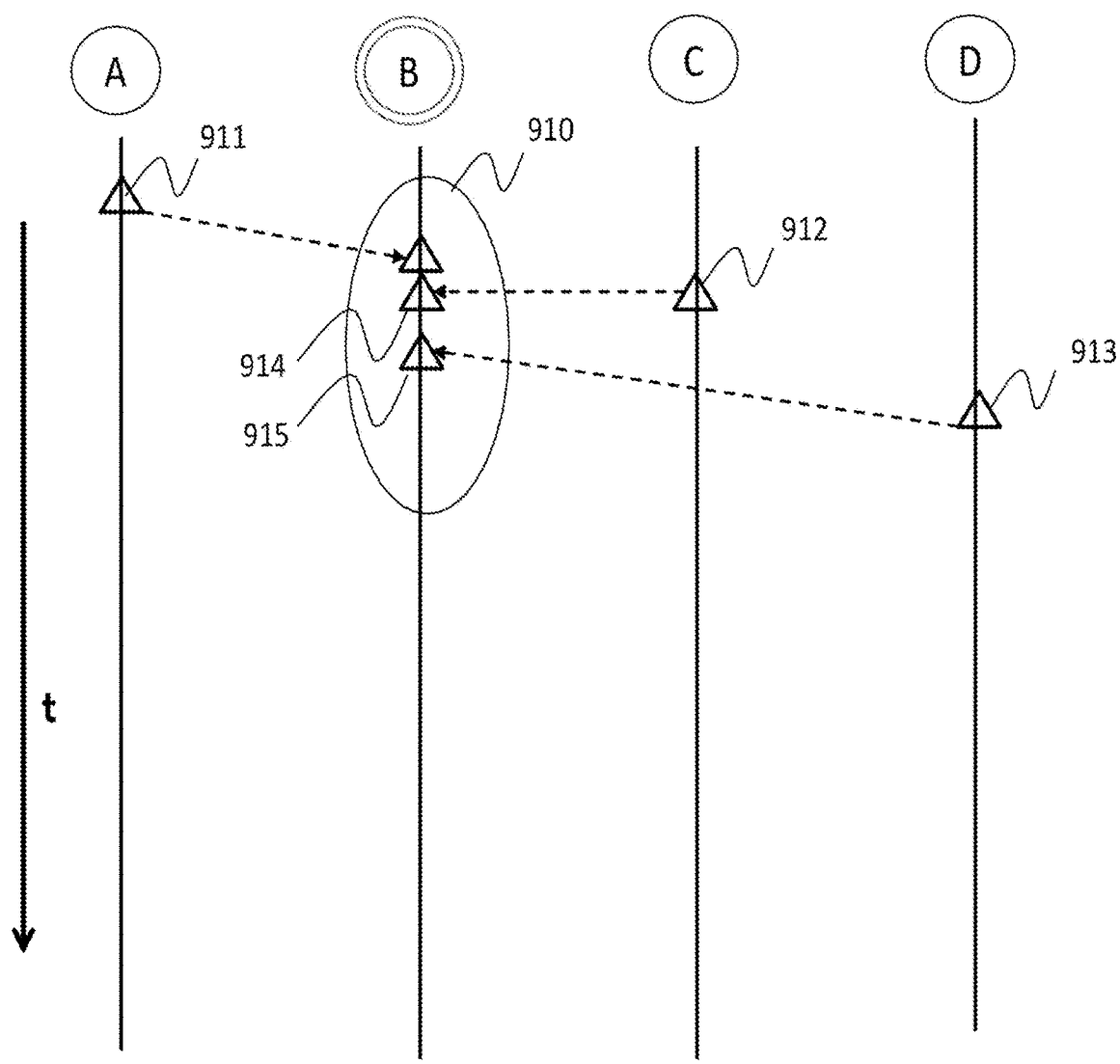
FIG. 9F is a conceptual diagram illustrating part of the processing for integrating log.

FIG. 9F is an enlarged diagram of the time base in the vicinity of a block 910 of FIG. 9E. As previously described, the time of the TS 912 is made to coincide with the time of the TS 914 in Procedure S606. Subsequently, the time stamp orders-of-sending-and-receiving confirmation processing section 183 confirms whether reversal occurs between the sending timing of the instruments A, C, and D and receiving timing in the log B in Procedure S607. In the example of FIG. 9F, the reversal occurs between a TS 913 of the sending timing in the log D and a TS 915 of receiving timing in the log B. Therefore, the time stamp adjustment processing section 188 makes adjustment to resolve the reversal by adding the difference between the sending timing and the receiving timing plus R to the time stamps in the log B to shift the time base of the log B. When the reversal is present in a plurality of sending/receiving pairs, the B is added to the largest difference. The R is, for example, a constant specified as a margin in advance.

Figure 9G:
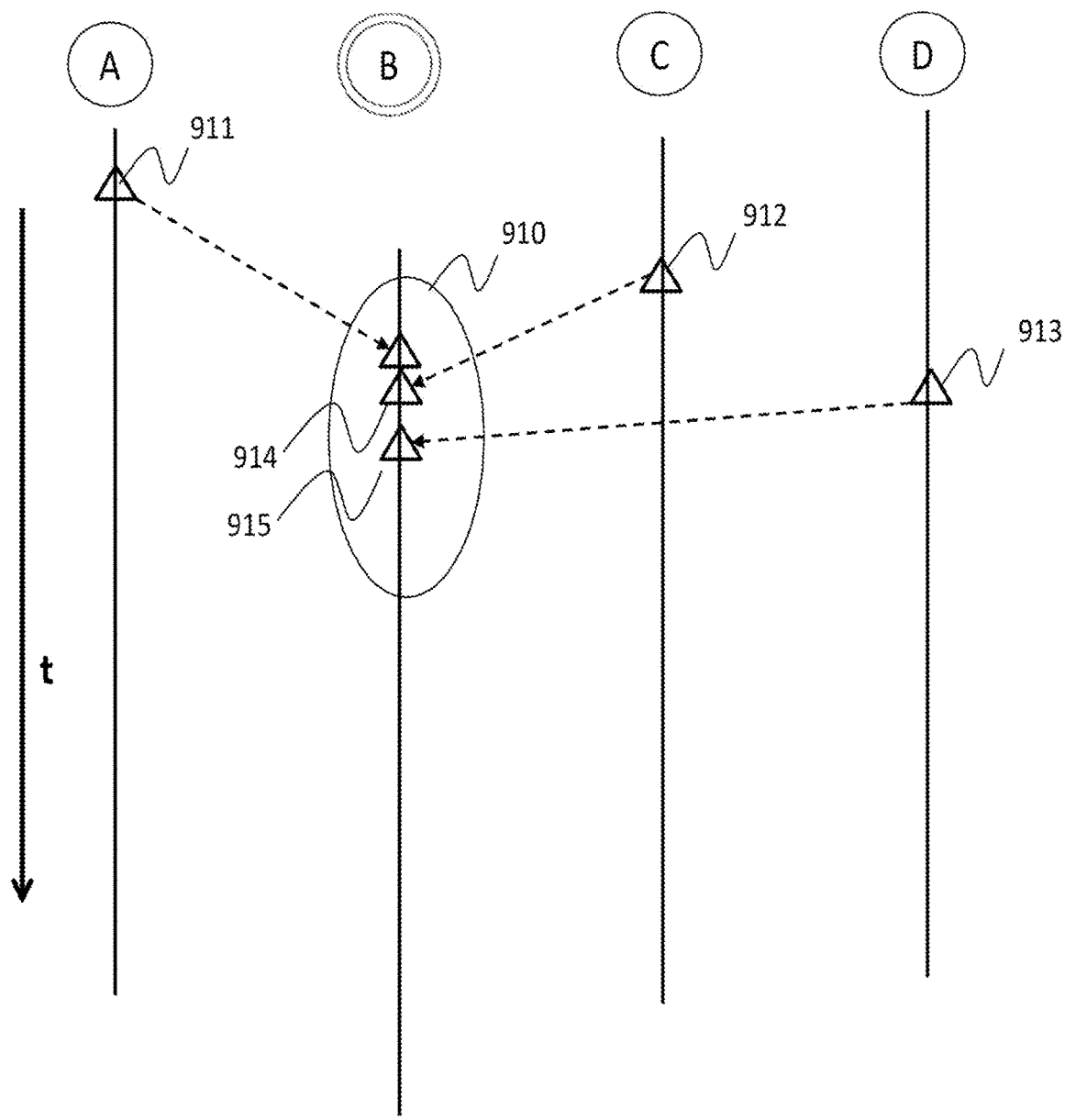
FIG. 9G is a conceptual diagram illustrating part of the processing for integrating log.

FIG. 9G depicts a state of resolving the reversal in the times of the TS 913 and the TS 915 in Procedure S606.

In Procedure S609, the time stamp adjustment processing section 188 continues to perform processing for subtracting y, for which the reversal of the time stamps does not occur in the sending/receiving pair having the smallest difference, from the time stamps in the receiving side log. The y is an adjustable variable and can be specified based on the times of the time stamps of the sending/receiving pair. This processing makes it possible to reduce a temporal difference between the time stamps of the sending/receiving pair and avoid an unnecessarily large lag between the times of the sending/receiving pair. It is to be noted, however, this processing can be omitted.

Figure 9H:
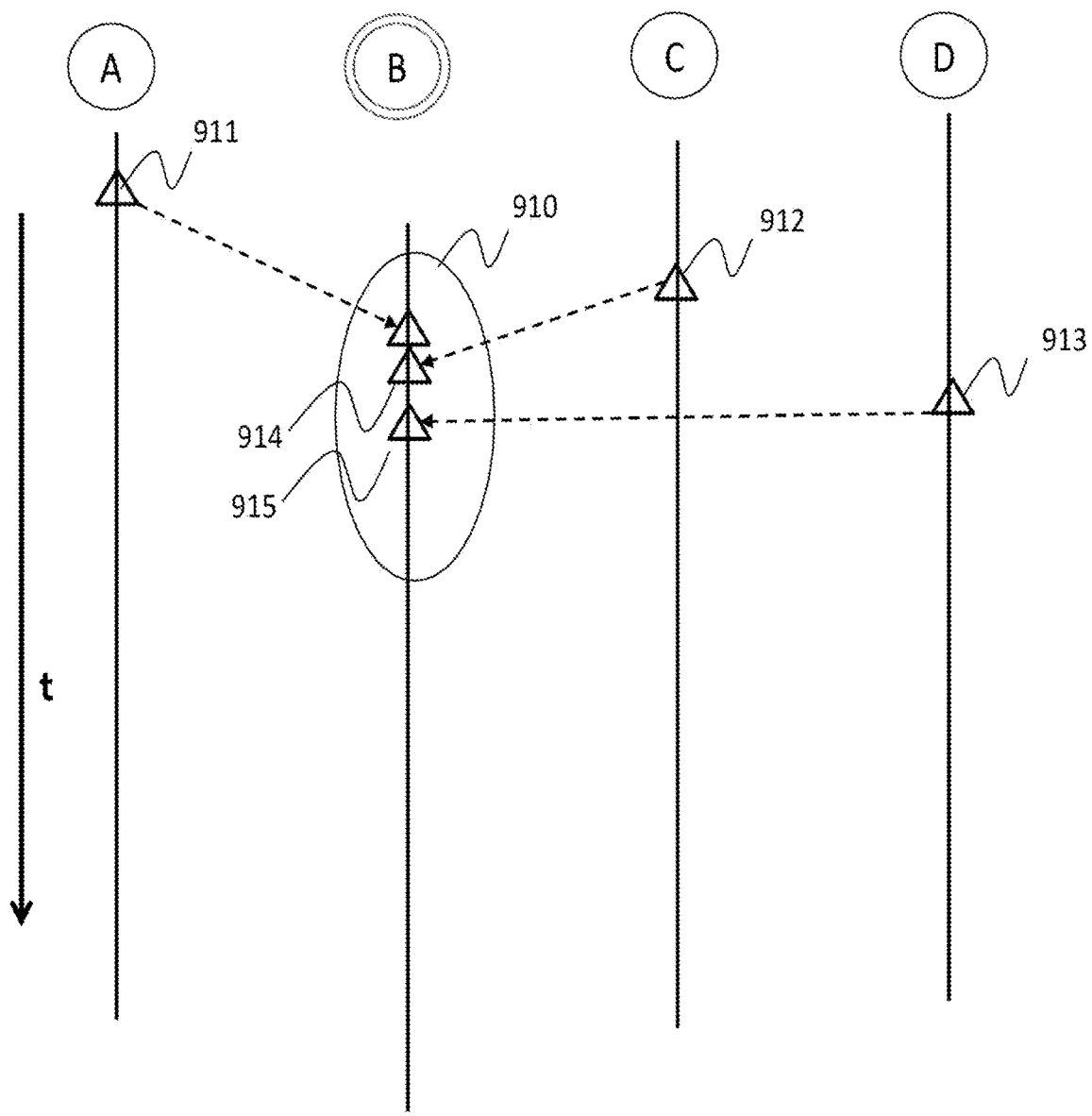
FIG. 9H is a conceptual diagram illustrating part of the processing for integrating log.

FIG. 9H depicts a state of the logs after Procedure S609. Since the sending/receiving pair having the smallest difference between the time stamps are the TS 913 and the TS 915 in the state of FIG. 9G, the time stamp adjustment processing section 188 subtracts y from the time stamps in the log B in a range in which reversal does not occur between the TS 913 and the TS 915.

In Procedure S610, in a case of presence of the other second type instrument 130, Procedure S605 and the subsequent procedures are similarly carried out for the instrument. In a case of absence of the other second type instrument 130, the processing goes to Procedure S611.

In Procedure S611, the integrated log generation section 181 integrates the logs of all instruments on the basis of the time stamps and generates an integrated log. The integrated log generation section 181 stores the generated integrated log in the integrated log storage section 186. While a format of the integrated log is optional, the integrated log generation section 181 may integrate the logs on the basis of the time stamps obtained by, for example, correcting the time stamps in the logs of the instruments depicted in FIGS. 7 and 8 by the processing described above.

The log integrated in order of time as the overall series is stored in the integrated log storage section 186 by the processing described so far. It is thereby possible to correctly integrate the logs of the configurable instruments and the non-configurable instrument that are not always in time synchronization as a log of the overall series in an environment in which a plurality of autonomously operating instruments affect one another.

In the present embodiment, the instruments are operable even in a heterogeneous series including the non-configurable instrument. In other words, it is possible to grasp the operations as the series on the premise that all instruments are not necessarily configurable and that all instruments are not necessarily in time synchronization. Owing to this, it is possible to set the instruments in the series as objects to be analyzed for process mining as not only analysis data at the time of occurrence of a failure but also as an operating recipe in the series at a time of a normal operation.

What is claimed is:

1. An apparatus for integrating log, for integrating logs in a series including a plurality of instruments generating the logs, comprising:
    a log acquisition section;
    a message ID time stamp processing section;
       a time stamp adjustment processing section; and
    a time stamp orders-of-sending-and-receiving confirmation processing section, wherein
    the log acquisition section acquires a plurality of logs from the plurality of instruments,
    the message ID time stamp processing section causes times of time stamps to coincide with each other in one sending and receiving pair of broadcast messages having an identical message ID in the plurality of logs,
    the time stamp adjustment processing section adjusts time bases of the plurality of logs on a basis of the coincident time of the time stamps,
    the time stamp orders-of-sending-and-receiving confirmation processing section confirms whether time reversal is present in the time stamps of the sending and receiving pair of the broadcast messages having the identical message ID in the plurality of time-base-adjusted logs, and
    the time stamp adjustment processing section adjusts the time bases of the plurality of logs in such a manner as to resolve the time reversal in a case of presence of the time reversal in the time stamps of the sending and receiving pair of the broadcast message.

2. The apparatus for integrating log according to claim 1, further comprising:
    a pattern extraction processing section, wherein
    the pattern extraction processing section extracts, from the plurality of logs, sending blocks that indicate sending patterns of unicast messages in logs of a plurality of sending side instruments and a receiving block that indicates receiving patterns corresponding to the sending patterns in the log of one receiving side instrument, and
    the time stamp adjustment processing section adjusts time stamps in the log of the receiving side instrument in such a manner that times of time stamps of a sending and receiving pair of unicast messages smallest in temporal difference in a pair of each of the sending blocks and the receiving block.

3. The apparatus for integrating log according to claim 2, wherein
    the time stamp orders-of-sending-and-receiving confirmation processing section confirms whether time reversal is present in the time stamps of the sending and receiving pair of the unicast messages in the pair of each of the sending blocks and the receiving block, and
    the time stamp adjustment processing section adjusts the time bases of the plurality of logs in such a manner as to resolve the time reversal in a case of presence of the time reversal in the time stamps of the sending and receiving pair of the unicast messages.

4. The apparatus for integrating log according to claim 3, wherein
    the time stamp adjustment processing section reduces the temporal difference between the time stamps of the sending and receiving pair of the unicast messages in a range in which the time reversal does not occur in the time stamps of the sending and receiving pair of the unicast messages.

5. A system for integrating log, having the apparatus for integrating log according to claim 2, a first type instrument, and a second type instrument included in the series, the apparatus for integrating log integrating a first log generated by the first type instrument with a second log generated by the second type instrument, wherein
    the first type instrument includes a broadcast message generation section capable of sending and interpreting the broadcast messages, and the second type instrument does not include the broadcast message generation section.

6. The system for integrating log according to claim 5, wherein the first type instrument sends a broadcast message having the message ID.

7. The system for integrating log according to claim 6, wherein upon receiving a broadcast message having the message ID, the first type instrument sends a response having the same message ID to a source.

8. The system for integrating log according to claim 6, wherein the first type instrument sends a unicast message, which is to be output to a log, to the second type instrument.

9. The system for integrating log according to claim 8, wherein the first type instrument sends the unicast message, which is to be output to the log, on an opportunity of sending the broadcast message.

10. The system for integrating log according to claim 8, wherein the first type instrument sends the unicast message, which is to be output to the log, to the second type instrument on an opportunity of receiving the broadcast message.

11. A system for integrating log, for integrating logs in a series including a plurality of instruments generating the logs, comprising:
a log acquisition section;
a message ID time stamp processing section;
a time stamp adjustment processing section; and
a time stamp orders-of-sending-and-receiving confirmation processing section, wherein
the log acquisition section acquires a plurality of logs from the plurality of instruments,
the message ID time stamp processing section causes times of time stamps to coincide with each other in one sending and receiving pair of broadcast messages having an identical message ID in the plurality of logs,
the time stamp adjustment processing section adjusts time bases of the plurality of logs on a basis of the coincident time of the time stamps,
the time stamp orders-of-sending-and-receiving confirmation processing section confirms whether time reversal is present in the time stamps of the sending and receiving pair of the broadcast messages having the identical message ID in the plurality of time-base-adjusted logs, and
the time stamp adjustment processing section adjusts the time bases of the plurality of logs in such a manner as to resolve the time reversal in a case of presence of the time reversal in the time stamps of the sending and receiving pair of the broadcast messages.

12. The system for integrating log according to claim 11, further comprising:
a pattern extraction processing section, wherein the pattern extraction processing section extracts, from the plurality of logs, sending blocks that indicate sending patterns of unicast messages in logs of a plurality of sending side instruments and a receiving block that indicates receiving patterns corresponding to the sending patterns in the log of one receiving side instrument, and
the time stamp adjustment processing section adjusts time stamps in the log of the receiving side instrument in such a manner that times of time stamps of a sending and receiving pair of unicast messages smallest in temporal difference in a pair of each of the sending blocks and the receiving block.

13. The system for integrating log according to claim 12, wherein the time stamp orders-of-sending-and-receiving confirmation processing section confirms whether time reversal is present in the time stamps of the sending and receiving pair of the unicast messages in the pair of each of the sending blocks and the receiving block, and
the time stamp adjustment processing section adjusts the time bases of the plurality of logs in such a manner as to resolve the time reversal in a case of presence of the time reversal in the time stamps of the sending and receiving pair of the unicast messages.

14. The system for integrating log according to claim 13, wherein the time stamp adjustment processing section reduces the temporal difference between the time stamps of the sending and receiving pair of the unicast messages in a range in which the time reversal does not occur in the time stamps of the sending and receiving pair of the unicast messages.

15. A method for integrating log, for integrating logs in a series including a plurality of instruments generating the logs, comprising:
acquiring a plurality of logs from the plurality of instruments using a log acquisition section acquires,
causing times of time stamps to coincide with each other in one sending and receiving pair of broadcast messages having an identical message ID in the plurality of logs using a message ID time stamp processing section,
adjusting time bases of the plurality of logs on a basis of the coincident time of the time stamps using a time stamp adjustment processing section,
confirming whether time reversal is present in the time stamps of the sending and receiving pair of the broadcast messages having the identical message ID in the plurality of time-base-adjusted logs using a time stamp orders-of-sending-and-receiving confirmation processing section, and
adjusting the time bases of the plurality of logs in such a manner as to resolve the time reversal in a case of presence of the time reversal in the time stamps of the sending and receiving pair of the broadcast messages using the time stamp adjustment processing section.

16. The method for integrating log according to claim 15, further comprising:
extracting, from the plurality of logs, sending blocks that indicate sending patterns of unicast messages in logs of a plurality of sending side instruments and a receiving block that indicates receiving patterns corresponding to the sending patterns in the log of one receiving side instrument using a pattern extraction processing section, and
adjusting time stamps in the log of the receiving side instrument in such a manner that times of time stamps of a sending and receiving pair of unicast messages smallest in temporal difference in a pair of each of the sending blocks and the receiving block using the time stamp adjustment processing section.

17. The method for integrating log according to claim 16, further comprising:
confirming whether time reversal is present in the time stamps of the sending and receiving pair of the unicast messages in the pair of each of the sending blocks and the receiving block using the time stamp orders-of-sending-and-receiving confirmation processing section, and
adjusting the time bases of the plurality of logs in such a manner as to resolve the time reversal in a case of presence of the time reversal in the time stamps of the sending and receiving pair of the unicast messages using the time stamp adjustment processing section.

18. The system for integrating log according to claim 17, wherein reducing the temporal difference between the time stamps of the sending and receiving pair of the unicast messages in a range in which the time reversal does not occur in the time stamps of the sending and receiving pair of the unicast messages using the time stamp adjustment processing section.

* * * * *